US009407419B2

(12) United States Patent
Yang et al.

(10) Patent No.: US 9,407,419 B2
(45) Date of Patent: Aug. 2, 2016

(54) METHOD FOR USER EQUIPMENT TRANSRECEIVING SIGNAL IN WIRELESS COMMUNICATION SYSTEM

(75) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 14/119,128

(22) PCT Filed: Jun. 28, 2012

(86) PCT No.: PCT/KR2012/005153
§ 371 (c)(1),
(2), (4) Date: Nov. 20, 2013

(87) PCT Pub. No.: WO2013/002591
PCT Pub. Date: Jan. 3, 2013

(65) Prior Publication Data
US 2014/0086119 A1   Mar. 27, 2014

Related U.S. Application Data

(60) Provisional application No. 61/501,787, filed on Jun. 28, 2011.

(51) Int. Cl.
*H04J 3/00*   (2006.01)
*H04L 5/00*   (2006.01)

(52) U.S. Cl.
CPC ............ *H04L 5/0058* (2013.01); *H04L 5/0007* (2013.01); *H04L 5/0053* (2013.01); *H04L 5/0094* (2013.01)

(58) Field of Classification Search
None
See application file for complete search history.

(56) References Cited

U.S. PATENT DOCUMENTS

2009/0180435 A1* 7/2009 Sarkar ................. H04L 5/14
370/330
2009/0316626 A1* 12/2009 Lee .................... H04L 1/1607
370/328

(Continued)

FOREIGN PATENT DOCUMENTS

KR   10-2010-0092475 A   8/2010
WO   WO 2010/095887 A2   8/2010

OTHER PUBLICATIONS

3GPP, "3rd Generation Partnership Project; Technical Specification Group Radio Access Network; Physical layer aspects for evolved Universal Terrestrial Radio Access (UTRA)(Release7)," 3GPP TR 25.814 V7.1.0, Sep. 2006, pp. 1-132.

(Continued)

*Primary Examiner* — Gregory Sefcheck
*Assistant Examiner* — Jael Ulysse
(74) *Attorney, Agent, or Firm* — Birch, Stewart, Kolasch & Birch, LLP (57) ABSTRACT

The present invention relates to a method for transceiving signals between a user equipment and a base station in a wireless communication system, and to an apparatus for same. More particularly, a method for the user equipment transceiving the signal in the wireless communication system, which is operated by a time division duplex (TDD), comprises the steps of: monitoring a physical downlink control channel (PDCCH) with respect to a special frame; and receiving a physical downlink shared channel (PDSCH) that corresponds to the PDCCH from the special subframe, when a PDCCH having downlink allocation information of the special subframe is detected, wherein the PDSCH is received by at least one orthogonal frequency division multiplexing (OFDM) symbol from a plurality of OFDM symbols that correspond to a defined guard period (GP) and an uplink pilot time slot (UpPTS) within the special subframe, according to a TDD uplink-downlink configuration.

10 Claims, 5 Drawing Sheets

(56) References Cited

U.S. PATENT DOCUMENTS

| | | | | |
|---|---|---|---|---|
| 2010/0034077 | A1* | 2/2010 | Ishii | H04J 11/00 370/210 |
| 2010/0165939 | A1* | 7/2010 | Lin | H04L 5/0053 370/329 |
| 2010/0246456 | A1* | 9/2010 | Suo | H04W 56/003 370/280 |
| 2011/0092240 | A1* | 4/2011 | Aiba | H04L 1/0025 455/509 |
| 2011/0164584 | A1* | 7/2011 | Seo | H04W 72/042 370/329 |
| 2011/0205954 | A1* | 8/2011 | Gorokhov | H04L 5/0007 370/315 |
| 2011/0235584 | A1* | 9/2011 | Chen | H04L 1/008 370/328 |
| 2011/0317780 | A1* | 12/2011 | Kang | H04L 5/0007 375/260 |
| 2013/0039193 | A1* | 2/2013 | Yin | H04W 72/0486 370/252 |
| 2013/0272188 | A1 | 10/2013 | Seo et al. | |

OTHER PUBLICATIONS

TD TECH, "Special Time Slot Configuration for LTE Frame-Structure FS2," 3GPP TSG-RAN WG1, Nov. 5-9, 2007, 3 pages total, R1-075006.

* cited by examiner

METHOD FOR USER EQUIPMENT TRANSRECEIVING SIGNAL IN WIRELESS COMMUNICATION SYSTEM

CROSS REFERENCE TO RELATED APPLICATIONS

This application is the National Phase of PCT/KR2012/005153 filed on Jun. 28, 2012, which claims priority under 35 U.S.C. 119(e) to U.S. Provisional Application No. 61/501,787 filed on Jun. 28, 2011, all of which are incorporated by reference into the present application.

FIELD OF THE INVENTION

The present invention relates to a wireless communication system, and, more particularly, to a method for transceiving a signal between a user equipment and a base station in a wireless communication system and an apparatus for the same.

BACKGROUND ART

Wireless communication systems are being broadly developed in order to provide various types of communication services, such as voice or data services. Generally, a wireless communication system corresponds to a multiple access system that may support communication with multiple users by sharing an available system source (bandwidth, transmission power, and so on). Examples of a multiple access system include a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system, and so on.

DETAILED DESCRIPTION OF THE INVENTION

Technical Objects

An object of the present invention is to provide a method for receiving a signal between a user equipment and a base station in a wireless communication system and an apparatus for the same.

The technical objects of the present invention will not be limited only to the objects described above, and any other additional technical objects that have not been mentioned in the description will become apparent to those having ordinary skill in the art upon the following description of the present application.

Technical Solutions

In an aspect of the present invention, a method of a user equipment for transceiving signals in a wireless communication system being operated by TDD (Time Division Duplex) includes the steps of monitoring a PDCCH (Physical Downlink Control CHannel) signal respective to a special subframe; and, in case a PDCCH signal having downlink allocation information of the special subframe is detected, receiving a PDSCH (Physical Downlink Shared CHannel) signal corresponding to the PDCCH in the special subframe, wherein the PDSCH signal may be received through one OFDM symbol of multiple OFDM (Orthogonal Frequency Division Multiplexing) symbols corresponding to a GP (Guard Period) and a UpPTS (Uplink Pilot Time Slot), wherein the GP and the UpPTS are defined in the special subframe.

Meanwhile, in another aspect of the present invention, a user equipment configured to transceive signals in a wireless communication system being operated by TDD (Time Division Duplex) includes a Radio Frequency (RF) unit; and a processor, wherein the processor may be configured to monitor a PDCCH (Physical Downlink Control CHannel) signal respective to a special subframe, and, in case a PDCCH signal having downlink allocation information of the special subframe is detected, to receive a PDSCH (Physical Downlink Shared CHannel) signal corresponding to the PDCCH in the special subframe, and wherein the PDSCH signal may be received through one OFDM symbol of multiple OFDM (Orthogonal Frequency Division Multiplexing) symbols corresponding to a GP (Guard Period) and a UpPTS (Uplink Pilot Time Slot), wherein the GP and the UpPTS are defined in the special subframe.

Moreover, the GP of the special subframe may be allocated to a reception ending point of the PDSCH signal. And, based upon a GP ending point of the special subframe, an uplink signal may be further transmitted earlier as much as a TA (Timing Advance). Most particularly, the uplink signal may include an SRS (Sounding Reference Signal).

Furthermore, the PDCCH signal of the special subframe may be received through a downlink subframe existing before the special subframe. And, most particularly, the PDSCH signal may be further received through one OFDM symbol of at least one of multiple OFDM (Orthogonal Frequency Division Multiplexing) symbols corresponding to a DwPTS (Downlink Pilot Time Slot), wherein the DwPTS is defined in the special subframe in accordance with the TDD Uplink-Downlink Configuration.

Effects of the Invention

According to the exemplary embodiment of the present invention, in the wireless communication system, the user equipment may efficiently transceive (or transmit/receive) a signal to/from the base station.

The effects that may be gained from the embodiment of the present invention will not be limited only to the effects described above. Accordingly, other effects of the present application, which are not mentioned herein, will become apparent to those having ordinary skill in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the technical principle of the invention.

MODE FOR CARRYING OUT THE PRESENT INVENTION

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system.

For the clarity in the description of the present invention, the present invention will be described based upon the 3GPP LTE/LTE-A systems. Nevertheless, the scope and spirit of the present invention will not be limited only to those of the 3GPP LTE system and the 3GPP LTE-A system. Additionally, the specific terms used in the following description of the present invention are provided to facilitate the understanding of the present invention. And, therefore, without deviating from the technical scope and spirit of the present invention, such specific terms may also be varied and/or replaced by other terms.

In a wireless communication system, a user equipment may receive information from a base station via downlink (DL), and the user equipment may also transmit information via uplink (UL). The information received and/or transmitted (or transceived) by the user equipment includes data and diverse control information. And, various physical channels may exist depending upon the type and purpose of the information received and/or transmitted (or transceived) by the user equipment.

Figure 1:
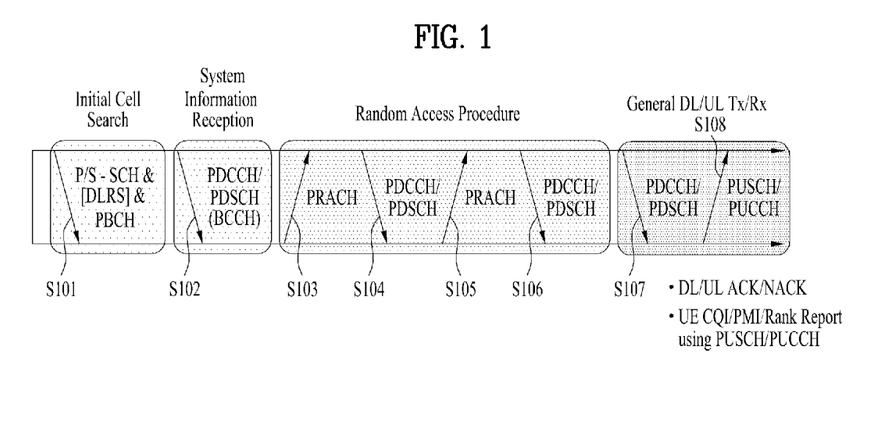
FIG. 1 illustrates physical channels that are used in a 3GPP LTE system, which corresponds to an exemplary wireless communication system, and a general signal transmitting method using the physical channels.

FIG. 1 illustrates physical channels that are used in a 3GPP LTE and a general signal transmitting method using the same.

When a power of a user equipment is turned off and then turned back on, or when a user equipment newly enters (or accesses) a cell, the user equipment performs an initial cell search process, such as synchronizing itself with the base station in step S101. For this, the user equipment may receive a Primary Synchronization Channel (P-SCH) and a Secondary Synchronization Channel (S-SCH) from the base station so as to be in synchronization with the base station, and the user equipment may also acquire information, such as cell ID. Thereafter, the user equipment may receive a Physical Broadcast Channel so as to acquire broadcast information within the cell. Meanwhile, the user equipment may receive Downlink Reference Signal (DL RS), in the step of initial cell search, so as to verify the downlink channel status.

The user equipment that has completed the initial cell search may receive a PDCCH (Physical Downlink Control Channel) and a PDSCH (Physical Downlink Shared Channel) based upon the PDCCH (Physical Downlink Control Channel) information, in step S102, so as to acquire more detailed system information.

Thereafter, in order to complete the access to the base station, the user equipment may perform a Random Access Procedure, such as in steps S103 and S106 of a later process, so as to complete the access to the base station. In order to do so, the user equipment transmits a preamble through a PRACH (Physical Random Access Channel) (S 103), and then the user equipment may receive a response message respective to the random access through the PDCCH and its respective PDSCH (S104). In case of a contention based random access, the user equipment may perform Contention Resolution Procedures, such as transmitting an additional Physical Random Access Channel (PRACH) (S 105) and receiving a Physical Downlink Control Channel (PDCCH) and a Physical Downlink Shared Channel (PDSCH) corresponding to the PDCCH (S 106).

After performing the above-described procedures, the user equipment may receive a Physical Downlink Control Channel (PDCCH)/Physical Downlink Shared Channel (PDSCH) (S 107), as a general uplink/downlink signal transmission procedure, and may then perform PUSCH (Physical Uplink Shared Channel)/PUCCH (Physical Uplink Control Channel) transmission (S 108). The control information being transmitted by the user equipment to the base station is collectively referred to as Uplink Control Information (UCI). The UCI may include HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 2:
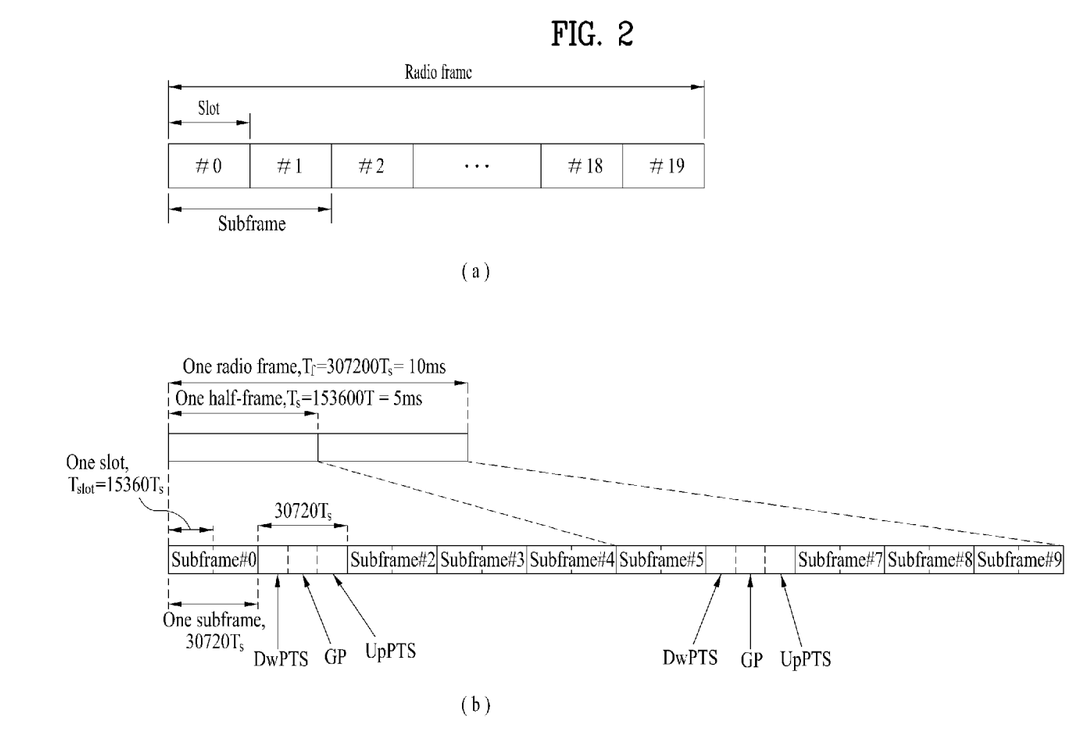
FIG. 2 illustrates an exemplary structure of a radio frame.

FIG. 2 illustrates an exemplary structure of a radio frame. In a cellular OFDM radio packet communication system, uplink/downlink data packet transmission is performed in subframe units, and once subframe is defined as a predetermined time period (or time section) including multiple OFDM symbols. The 3GPP LTE standard supports a Type 1 radio frame structure, which is applicable to FDD (Frequency Division Duplex), and a Type 2 radio frame structure, which is applicable to TDD (Time Division Duplex).

(a) of FIG. 2 illustrates an exemplary structure of a type 1 radio frame. A downlink radio (or wireless) frame is configured of 10 subframes, and one subframe is configured of 2 slots in a time domain. The time consumed (or taken) for one subframe to be transmitted is referred to as a TTI (transmission time interval). For example, the length of one subframe may be equal to 1 ms, and the length of one slot may be equal to 0.5 ms. One slot includes a plurality of OFDM symbols in the time domain and includes a plurality of Resource Blocks (RBs) in the frequency domain. Since the 3GPP LTE system uses the OFDMA in a downlink, an OFDM symbol indicates one symbol section. The OFDM symbol may also be referred to as an SC-FDMA symbol or a symbol section. As a resource allocation unit, a Resource Block (RB) may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot becomes smaller than when the OFDM symbol is configured of a normal CP. In case of the extended CP, for example, the number of OFDM symbols included in one slot may be equal to 6. In case the user equipment is moving at high speed, or in case the channel status is unstable, the extended CP may be used in order to further reduce the interference between the symbols.

In case of using the normal CP, since one slot includes 7 OFDM symbols, one subframe includes 14 OFDM symbols. At this point, the first maximum of 3 OFDM symbols of each subframe are allocated to a PDCCH (physical downlink control channel), and the remaining OFDM symbols may be allocated to a PDSCH (physical downlink shared channel).

(b) of FIG. 2 illustrates an exemplary structure of a type 2 radio frame. The type 2 radio frame consists of 2 half frames, each half frame is configured of 4 general subframes each including 2 slots and a special subframe including a DwPTS (Downlink Pilot Time Slot), a Guard Period (GP), and a UpPTS (Uplink Pilot Time Slot).

In the special subframe, DwPTS is used for performing initial cell search, synchronization or channel estimation in the user equipment, and UpPTS is used for matching a channel estimation performed in the based station with an uplink transmission synchronization performed in the user equipment. More specifically, the DwPTS is used for downlink transmission, and the UpPTS is used for uplink transmission, and, most particularly, UpPTS is used for the purposed of transmitting a PRACH preamble or SRS. Additionally, the guard period refers to a period for eliminating (or removing) interference that occurs in an uplink, due to a multiple path delay of a downlink signal between an uplink and a downlink.

In the current 3GPP standard document, the configuration of a special subframe is defined as shown below in Table 1. In Table 1, when $T_s=1/(15000*2048)$, this indicates DwPTS and UpPTS, and the remaining area is set up as the guard period.

TABLE 1

| | | Normal cyclic prefix in downlink | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Meanwhile, in a Type 2 radio frame structure, more specifically, in a TDD system, an uplink/downlink subframe configuration (UL/DL configuration) is as shown below in Table 2.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D corresponds to a downlink subframe, U indicates an uplink subframe, and S represents the special subframe. Additionally, in Table 2, downlink-uplink switching cycle (or interval) in the uplink/downlink subframe configuration of each system.

The above-described structure of the radio frame is merely exemplary. And, therefore, the number of subframes included in the radio frame or the number of slots included in a subframe, and the number of symbols included in one slot may be diversely varied.

Figure 3:
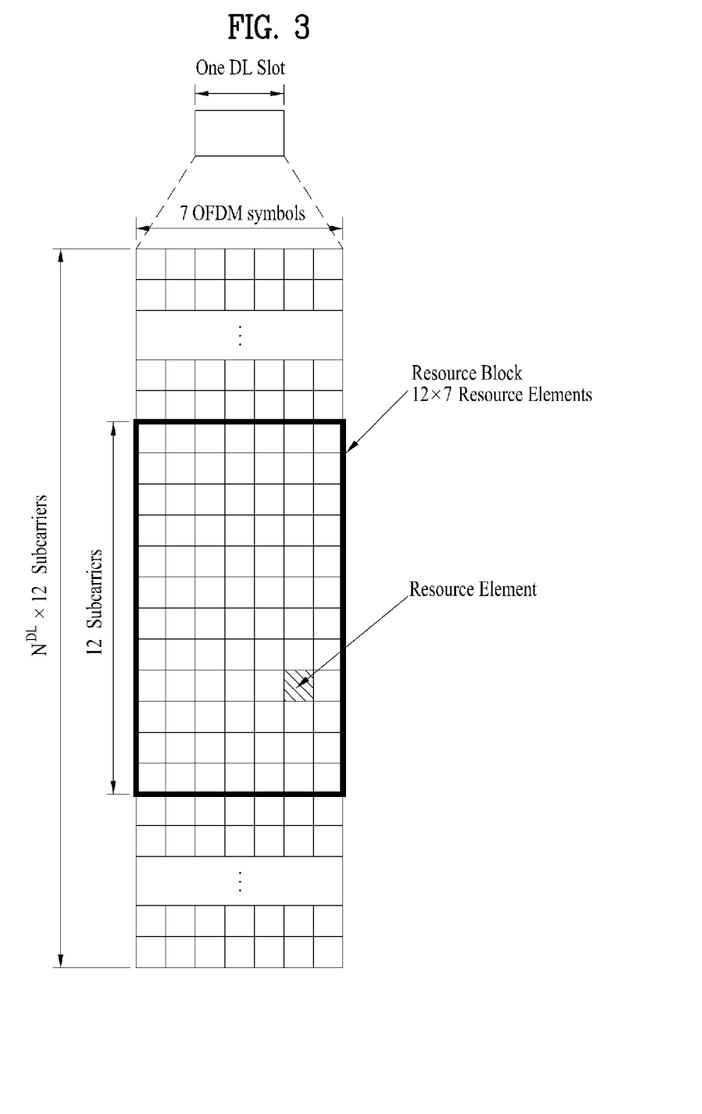
FIG. 3 illustrates an exemplary resource grid of a downlink slot.

FIG. 3 illustrates an exemplary resource grid of a downlink slot.

Referring to FIG. 3, a downlink slot includes multiple OFDM symbols in the time domain. One downlink slot may include 7(6) OFDM symbols in a time domain, and a resource block (RB) may include 12 sub-carriers in the frequency domain. Each element within the resource grid is referred to as a Resource Element (RE). One RB includes 12×7(6) REs. $N_{RB}$, which corresponds to the number of RBs, An $N^{DL}$ number of resource blocks included in a downlink slot is dependent to a downlink transmission bandwidth. The structure of an uplink slot may be identical to the above-described structure of the downlink slot. However, the OFDM symbol may be replaced with the SC-FDMA symbol.

Figure 4:
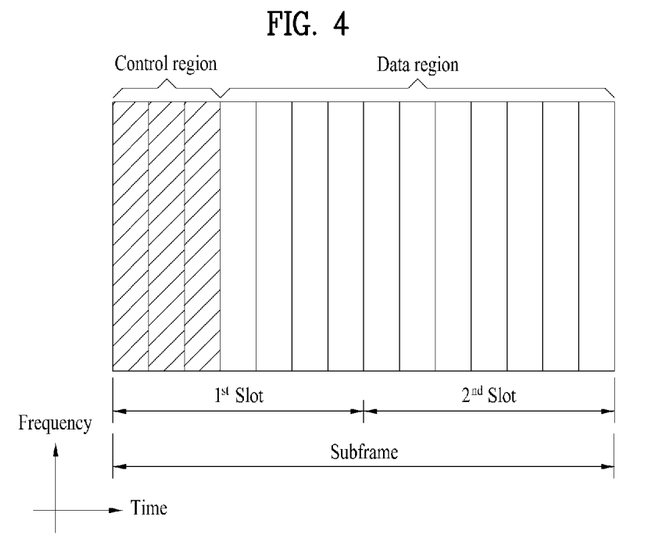
FIG. 4 illustrates a structure of a downlink frame.

FIG. 4 illustrates an exemplary structure of a downlink frame.

Referring to FIG. 4, a maximum of 3(4) OFDM symbols located at the front portion of a first slot within one subframe corresponds to a control region, wherein a control channel is allocated (or assigned). The remaining OFDM symbols correspond to a data region, wherein a Physical Downlink Shared Channel (PDSCH) is assigned. Examples of the downlink control channels that are being used in the LTE system may include a Physical Control Format Indicator Channel (PCFICH), a Physical Downlink Control Channel (PDCCH), a Physical Hybrid automatic repeat request Indicator Channel (PHICH), and so on. The PCFICH carries information on the number of OFDM symbols being transmitted from the first OFDM symbol of a subframe and being used in the control channel transmission within the subframe. As a response to an uplink transmission, the PHICH may carry HARQ ACK/NACK (Hybrid Automatic Repeat request acknowledgment/negative-acknowledgment) signals.

The control information being transmitted through the PDCCH may be referred to as DCI (Downlink Control Information). Herein, the DCI may include resource allocation information for a user equipment or user equipment group and other control information. For example, the DCI may include uplink/downlink scheduling information, an uplink transmission (Tx) power control command, and so on.

The PDCCH may carry a transmission format and resource allocation information of a downlink shared channel (DL-SCH), a transmission format and resource allocation information of an uplink shared channel (UL-SCH), paging information of a paging channel (PCH), system information of the DL-SCH, resource allocation information of a higher-layer control message, such as a Random Access Response being transmitted over the PDSCH, a set of Tx power control commands on individual user equipments within the user equipment group, a Tx power control command, indication information on the activation of a VoIP (Voice over IP), and so on. A plurality of PDCCHs may be transmitted within the control region. And, the user equipment may monitor the plurality of PDCCHs. Herein, the PDCCH may be transmitted in the form of an aggregation of one or more consecutive Control Channel Elements (CCEs). A CCE corresponds to a logical allocation unit, which is used for providing a coding rate to a PDCCH based on a radio (or wireless) channel state. Herein, the CCR corresponds to multiple resource element groups (REGs). Herein, the number of PDCCH formats and the number of available data bits may be decided in accordance with the number of CCEs. The base station may decide a PDCCH format in accordance with the DCI, which is to be transmitted to the user equipment, and may add a CRC (Cyclic Redundancy Check) to the control information. Depending upon the owner of the PDCCH or the usage purpose of the PDCCH, the CRC may be masked with an identifier (e.g., an RNTI (Radio Network Temporary Identifier). For example, if the PDCCH is designated to a particular (or specific) user equipment, an identifier (e.g., cell-RNTI (C-RNTI)) of the corresponding user equipment may be masked to the CRC. Alternatively, if the PDCCH is designated to a paging message, a paging identifier (e.g., paging-RNTI (P-RNTI)) may be masked to the CRC. If the PDCCH is designated to system information (most particularly, to a system information block (SIC)), an S-RNTI (system information RNTI) may be masked to the CRC. If the PDCCH is designated to a random access response, an RA-RNTI (random access-RNTI) may be masked to the CRC.

Figure 5:
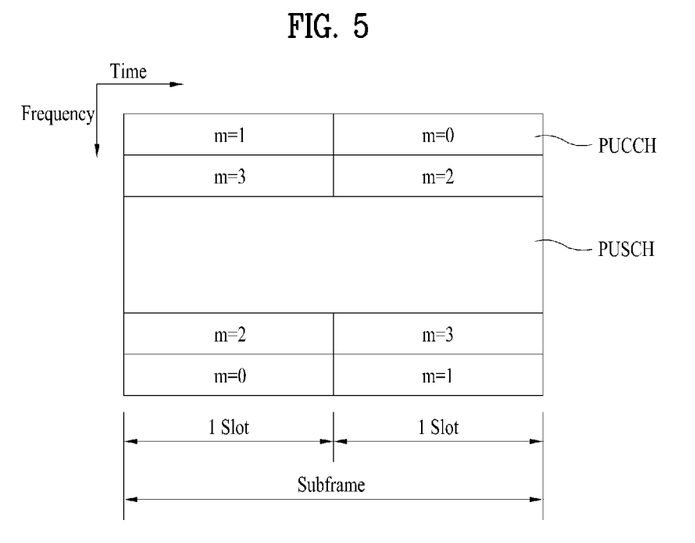
FIG. 5 illustrates a structure of an uplink subframe.

FIG. 5 illustrates an exemplary structure of an uplink subframe being used in the LTE.

Referring to FIG. 5, an uplink subframe includes multiple (e.g., 2) slots. A slot may include different numbers of SC-FDMA symbols based upon a CP length. In the frequency domain, an uplink subframe may be divided into a control region and a data region. The data region includes a PUSCH and is used for transmitting data signals, such as sound. The control region includes a PUCCH and is used for transmitting Uplink Control Information (UCI). The PUCCH includes an RB pair, which is located at each end portion of the data region along the frequency axis, and may be "frequency-hopped" at the slot boundary.

The PUCCH may be used for transmitting the following control information.

SR (Scheduling Request): corresponds to information that is used for requesting uplink UL-SCH resource. The SR is transmitted by using an OOK (On-Off Keying) method.

HARQ-ACK/NACK: corresponds to a response signal for a downlink data packet within the PDSCH. The HARQ-ACK/NACK indicates whether or not the downlink data packet has been successfully received. A 1-bit ACK/NACK is transmitted as a response for a single downlink codeword, and a 2-bit ACK/NACK is transmitted as a response for two downlink codewords.

CSI (Channel State Information): The CSI corresponds to feedback information respective to a downlink channel The CSI includes the CQI (Channel Quality Indicator), and feedback information related to the MIMO (Multiple Input Multiple Output) includes an RI (Rank Indicator), PMI (Precoding Matrix Indicator), PTI (Precoding Type Indicator), and so on. 20 bits are used for each subframe.

The amount (or size) of the control information (UCI) that can be transmitted by the user equipment from a subframe depends upon a number of SC-FDMAs that are available for control information transmission. The SC-FDMAs that are available for control information transmission refers to SC-FDMA symbols that remain after excluding the SC-FDMA symbol for reference signal transmission from the subframe. And, in case of a subframe having an SRS (Sounding Reference Signal) determined therein, the last SC-FDMA symbol of the subframe may also be excluded. Herein, a reference signal is used for a coherent detection of the PUCCH.

In a TDD based LTE system, in order to adaptively enhance the system performance to an uplink traffic load, which changes based upon an initially configured UL-DL configuration (ref. Table 1), a method of semi-statically or dynamically reconfiguring the purpose (or usage) of the subframe (e.g., a subframe that is defined as D (or U) in accordance with the conventional UL-DL configuration may be switched (or shifted) to U (or D) and operated accordingly) may be taken into consideration. In case of reconfiguring a subframe that is defined as a downlink to an uplink subframe, a UL grant is signaled in advance to each of the UEs. Thereafter, by defying the legacy UEs by using a method of omitting all scheduling respective to the conventional legacy UEs (e.g., LTE UEs) and/or signaling (e.g., PDCCH/PDSCH and/or PHICH) in the corresponding subframe, a method enabling PUSCH transmission to be performed from the UEs through the corresponding subframe may be used. However, even if a downlink subframe that has not received a PDCCH/PDSCH and/or PHICH is used, the legacy UE may still receive a CRS in order to perform measurement operations for the purpose of deciding CSI. Therefore, if a PUSCH signal transmitted by the UE is accidentally recognized as a CRS, and if a measurement report is performed accordingly, this may lead to a critical system degradation.

Therefore, in the UL-DL configuration, in case of switching a downlink subframe to an uplink subframe, an operation method of reconfiguring a special subframe (S) as U or D may be considered. For example, in case of the UE according to the exemplary embodiment of the present invention, among the OFDM symbols corresponding to the DwPTS period for performing downlink signal transmission, some of the OFDM symbols may be used for the uplink transmission, or, among the OFDM symbols corresponding to the UpPTS period for performing uplink signal transmission, some the OFDM symbols may be used for the downlink transmission. Furthermore, an OFDM symbol corresponding to a GP period (or section) for eliminating (or removing) signal interference, which is caused by a multiple path delay of a downlink signal, may be used for receiving an uplink signal or for transmitting a downlink signal.

Hereinafter, the present invention proposes a method that can enhance system performance by adaptively reconfiguring/reinterpreting the special subframe in accordance with traffic status. In order to realize the present invention, periods that cannot be reconfigured are required to be set to have the shortest length possible, in order to ensure sufficient amount of resources that can be reconfigured within the special subframe.

For example, by setting each of a CRS transmission region that is assumed by the legacy UE within the DwPTS period and an SRS region that is transmitted from the legacy UE within the UpPTS period to have the shortest length possible, a period available for reconfiguration may be ensured. More specifically, as shown in Configuration #0 in Table 1, a special subframe that is configured of a short DwPTS period and/or a short UpPTS period within the special subframe may be used.

In another example, in order to reduce a CRS section, which is assumed by the legacy UE within the DwPTS, all legacy UEs may be configured to be operated in an operation mode using a small number of RX antenna ports (i.e., in case the CRS antenna port number is equal to one or two, since the CRS is transmitted only from the first symbol, the length of the DwPTS period may be set up to have the shortest length, however, in case the CRS antenna port number is equal to 4, since the CRS is transmitted from the first two symbols, the length of the DwPTS period may be equal to the length of at least two symbols).

Additionally, in order to reduce the length of a period (e.g., a period for SRS transmission) that should be excluded from the reconfiguration of the UpPTS period, a Periodic SRS may be set up, so that an SRS that is being transmitted from the legacy UE does not within the corresponding special subframe.

Although the present invention is essentially described based upon Table 1 and Table 2, the same/similar principles of the present invention may also be applied to UL-DL configuration and S configuration that may be added in accordance with the wireless communication system for the UE. Hereinafter, the period within a subframe excluding the DwPTS period and the UpPTS period will be defined as GAP for simplicity in the description of the present invention. In the exemplary embodiment of the present invention, the UE is defined by a concept different from that of the Legacy UE, and in a wireless communication system operating by TDD (Time Division Dupelx), although the UE operates based upon an Uplink-Downlink Configuration (UL-DL configuration) for the legacy UE, it is defined herein that the UE may reconfigure/reinterpret DwPTS, GP, and UpPTS periods configuring the special subframe and may perform signal transmission/reception (or transception) (e.g., PDSCH signal reception, PUSCH signal transmission, and so on) in accordance with the reconfiguration/reinterpretation.

<First Embodiment>

In order to decide a period, which is reconfigured for the purpose of data reception, within the special subframe, when it is assumed that a period (or section) for CRS, PDCCH/PHICH signals, which are assumed by the legacy UE within the conventional DwPTS period, and/or synchronization signals (e.g., PSS) is defined as A, and when it is assumed that a period having the likelihood of an SRS being transmitted within the conventional UpPTS period is defined as C, and when the period that can be reconfigured by the UE as a reception period is defined as B, the length of a GAP (e.g., GP) respective to the UE may be reconfigured/reinterpreted to be equal to a period excluding A, B, and C from the special subframe (SF) (GP=1SF−(A+B+C)).

For example, when the S Configuration of Table 1 corresponds to #0, and when the CFI values within the corresponding subframe are respectively equal to 1, 2, and 3, it may be assumed that each length of the A period is equal to 1 symbol, 2 symbols, and 3 symbols, and, when the UpPTS period includes a cell-specific SRS transmission timing, it may be assumed that the length of the C period is equal to one symbol, and, otherwise, it may be assumed that the length of the C period is equal to 0 symbol. In this case, the B period is adjusted with respect to the lengths of A and C from the length of one subframe. For example, when it is assumed that the length of B, which is based upon a case when the length of A is equal to one symbol and when the length of C is equal to 0, is equal to B' symbols, when A is equal to two symbols or three symbols (herein, it will be assumed that C is equal to 0), B may be adjusted to B'-1 symbols, B'-2 symbols, and, when C is equal to one symbol instead of being equal to 0 (herein, it will be assumed that A is equal to one symbol), B may be reconfigured to be equal to B'-1 symbols. In another example, regardless of the CFI value, it may be assumed that A and C are each assigned with a pre-decided value (for example, when considering only the CRS transmission region, it may be assumed that A=1 symbol and C=0 symbol, and when considering both CRS and synchronization signal transmission regions, it may be assumed that A=3 symbols and C=0 symbols).

Based upon the structure of the reconfigured/reinterpreted special subframe, the UE may receive data signals through an OFDM symbol corresponding to a period (B period), which is configured for data reception (e.g., for PDSCH signal reception).

More specifically, immediately after the end of the A period, the UE may receive a data signal (e.g., PDSCH signal) for as long as the B period, and, after the end of the reception of the corresponding signal, based upon the ending point of the GAP period, the UE may transmit uplink transmission (e.g., SRS) within the C period, or the UE may not perform any operation. Additionally, in transmitting the uplink within the C period, it will be apparent that the uplink can be transmitted by applying TA (Timing Advance) of the UE.

Furthermore, configuration may be set up so that DL data respective to the UE can be received through the A period (excluding the CRS and/or PHICH and/or synchronization signal portion(s)). In this case, the UE may assume that A=0 and C=0 (regardless of the special subframe configuration (e.g., A, C)) and may, then, receive DL data.

Figure 6:
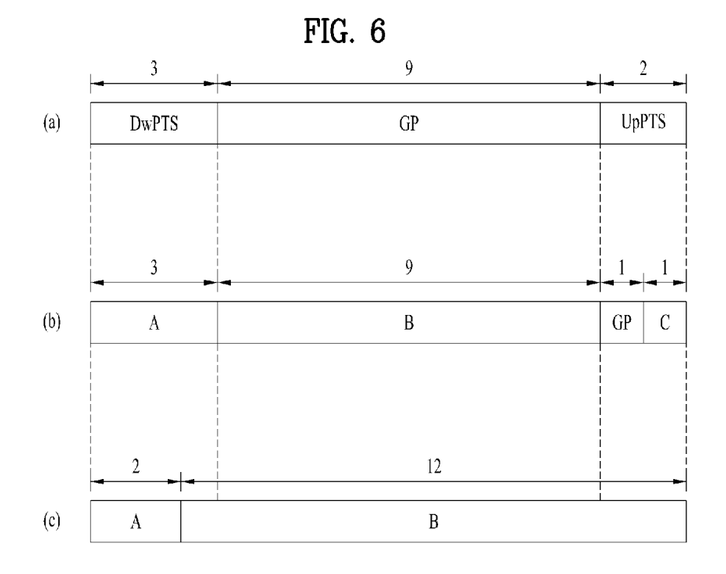
FIG. 6 illustrates an example of special subframe configurations of a UE according to a first exemplary embodiment of the present invention.

FIG. 6 illustrates an exemplary reception operation of the special subframe of the UE according to a first exemplary embodiment of the present invention. In FIG. 6a, the overall special subframe for the legacy UE is configured of 14 symbols, and it is assumed that the DwPTS is allocated with 3 symbols, that the GP is allocated with 9 symbols, and that the UpPTS is allocated with 2 symbols.

When the special subframe for the UE is defined as shown in 6b through RRC signaling, and so on, according to the first exemplary embodiment of the present invention, the UE may reconfigure the A period to a three symbol period, one symbol period for the GP, and the C period to a one symbol period.

Accordingly, the UE may decide the length of a symbol (B period) that can be used for data reception to be equal to a length corresponding to a 9 symbol period remaining from the special subframe after excluding A, GAP, C, and the UE may begin to receive the PDSCH signal starting from an OFDM symbol corresponding to the ending point of A until a point before the beginning of an OFDM symbol corresponding to the starting point of the GAP. Furthermore, the structure of the special subframe of the UE may reconfigure a whole period, which corresponds to one of DwPTS, GAP, and UpPTS of the special subframe for the legacy UE, to a period of downlink transmission. For example, as shown in FIG. 6c, when A occupies two symbols, and when GAP and UpPTS are entirely reconfigured/reinterpreted for downlink transmission, a section that can be used for data reception may be decided to be equal to 12 symbols, and the UE may receive a PDSCH signal through an OFDM symbol, which corresponds to the decided 12 symbols.

In the first exemplary embodiment of the present invention, DL scheduling information respective to the special subframe, which is reconfigured/reinterpreted by a TDD system, may be Semi-Statically configured through an RRC signaling/MAC message, and the configured DL scheduling information may be dynamically allocated through a DL Grant PDCCH. The DL Grant PDCCH, which delivers DL scheduling information respective to the reconfigured/reinterpreted special subframe, may be received through the respective special subframe (subframes #1, #6), with reference to Table 2, or through a downlink subframe (subframes #0, #5), which exist directly before the special subframe. Preferably, a downlink reconfiguration indication signal (e.g., PDCCH signal) may be configured to include an indicator, and the indicator may be realized in the form of an index, and so on, that can allow the UE to recognize the special subframe, which is reconfigured/reinterpreted based upon the downlink transmission. More specifically, with reference to Table 2, it may be assumed that an indicator related to special subframe #1 is included in the PDCCH signal, which is received by the downlink subframe being assigned with the subframe index of #0, and the PDDCH signal may be realized so that the UE can recognize whether or not to receive the downlink signal respective subframe #1.

Although an example of the following operation has been given based upon a case when the subframe reconfiguration indication information is being received through the PDCCH, for simplicity, the reconfiguration/reinterpretation operations of the UE respective to the subframe reconfiguration indication signal may be diversely realized.

For example, the UE may receive configurations of the special subframe structure (i.e., A, B, C values or information and parameters that can deduce such values) from the base station via RRC/L1/L2 signaling, and so on, or the UE may perform reconfiguration/reinterpretation by using values that have been defined in advance. More specifically, in case of receiving an indication signal, which performs reconfiguration/reinterpretation based upon the downlink transmission of the special subframe, the subframe structure may be reconfigured/reinterpreted as a pre-configured/pre-defined special subframe structure.

Furthermore, the UE may implicitly reconfigure/reinterpret the structure of the special subframe from a PCFICH (Physical Channel Format Indicator Channel), which is being received through a Downlink Pilot Time Slot (DwPTS) and/or from a presence or absence of a Cell-Specific SRS Transmission Timing of an Uplink Downlink Pilot Time Slot (UpPTS).

<Second Embodiment>

In order to decide a period, which is reconfigured for the purpose of data reception, within the special subframe, when it is assumed that a period (or section) for CRS, PDCCH/PHICH signals, which are assumed by the legacy UE within the DwPTS period, and/or synchronization signals (e.g., PSS) is defined as A, and when it is assumed that a period having the likelihood of an SRS being transmitted within the UpPTS period is defined as C, and when the period that can be reconfigured by the UE as a data transmission period is defined as B, the length of a GAP (e.g., GP) respective to the UE may be reconfigured/reinterpreted to be equal to a period excluding A, B, and C from the special subframe (SF) (GP=1SF−(A+B+C)).

For example, when the S Configuration of Table 1 corresponds to #0, and when the CFI values within the corresponding subframe are respectively equal to 1, 2, and 3, it may be assumed that each length of the A period is equal to 1 symbol, 2 symbols, and 3 symbols, and, when the UpPTS period includes a cell-specific SRS transmission timing, it may be assumed that the length of the C period is equal to one symbol, and, otherwise, it may be assumed that the length of the C period is equal to 0 symbol. In this case, the B period is adjusted with respect to the lengths of A and C from the length of one subframe. For example, when it is assumed that the length of B, which is based upon a case when the length of A is equal to one symbol and when the length of C is equal to 0, is equal to B' symbols, when A is equal to two symbols or three symbols (herein, it will be assumed that C is equal to 0), B may be adjusted to B'-1 symbols, B'-2 symbols, and, when C is equal to one symbol instead of being equal to 0 (herein, it will be assumed that A is equal to one symbol), B may be reconfigured to be equal to B'-1 symbols. In another example, regardless of the CFI value, it may be assumed that A and C are each assigned with a pre-decided value (for example, when considering only the CRS transmission region, it may be assumed that A=1 symbol and C=0 symbol, and when considering both CRS and synchronization signal transmission regions, it may be assumed that A=3 symbols and C=0 symbols).

Based upon the structure of the reconfigured/reinterpreted special subframe, the UE may transmit data signals through an OFDM symbol corresponding to a period (B period), which is configured for data transmission (e.g., for PDSCH signal transmission).

More specifically, the UE may transmit a data signal (e.g., PUSCH signal) for as long as the B period based upon a time point immediately following the end of the A period up to the ending point of the GAP, and, after the end of the transmission of the corresponding signal, the UE may transmit uplink transmission (e.g., SRS) within the C period, or the UE may not perform any operation. Additionally, in transmitting the uplink within the C period, it will be apparent that the uplink can be transmitted by applying TA (Timing Advance) of the UE.

However, in case the length of the C period is reinterpreted to be equal to 0, the data signal (e.g., PUSCH signal) may be extended up to an uplink frame immediately following the special subframe and then transmitted accordingly, and a single PUSCH signal transmission may be performed throughout the special subframe and the uplink frame.

In the second exemplary embodiment of the present invention, UL scheduling information respective to the special subframe, which is reconfigured/reinterpreted by a TDD system, may be Semi-Statically configured through an RRC signaling/MAC message, or the configured UL scheduling information may be dynamically configured through a UL Grant PDCCH.

Referring to Table 2, in case of a UL Grant PDCCH, which delivers UL scheduling information respective to the reconfigured/reinterpreted special subframe, when the index of the special subframe in the UL-DL configuration #0 of Table 2 corresponds to #1 and #6, starting from the special subframe that is to be reconfigured based upon the uplink transmission     a downlink subframe (#0, #5) existing 6 subframes earlier
      a downlink or special subframe (#1, #6) existing 5 subframes earlier
      a downlink subframe or a special subframe most approximate to a time point including a time point of 4 previous subframes and existing earlier than the corresponding time point
    may be received.

Preferably, an uplink reconfiguration indication signal (e.g., PDCCH signal) may be configured to include an indicator, and the indicator may be realized in the form of an index, and so on, that can allow the UE to recognize the special subframe, which is reconfigured/reinterpreted based upon the uplink transmission. More specifically, with reference to Table 2, it may be assumed that an indicator related to special subframe #6 is included in the PDCCH signal, which is received by the downlink subframe being assigned with the subframe index of #0, and the PDDCH signal may be realized so that the UE can recognize whether or not to transmit the uplink signal respective subframe #6.

Although an example of the following operation has been given based upon a case when the subframe reconfiguration indication information is being received through the PDCCH, for simplicity, the reconfiguration/reinterpretation operations of the UE respective to the subframe reconfiguration indication signal may be diversely realized.

For example, the UE may receive configurations of the special subframe structure (i.e., A, B, C values or information and parameters that can deduce such values) from the base station via RRC/L1/L2 signaling, and so on, or the UE may perform reconfiguration/reinterpretation by using values that have been defined in advance. More specifically, in case of receiving an indication signal, which performs reconfiguration/reinterpretation based upon the downlink transmission of the special subframe, the subframe structure may be reconfigured/reinterpreted as a pre-configured/pre-defined special subframe structure.

Furthermore, the UE may implicitly reconfigure/reinterpret the structure of the special subframe from a PCFICH (Physical Channel Format Indicator Channel), which is being received through a Downlink Pilot Time Slot (DwPTS) and/or from a presence or absence of a Cell-Specific SRS Transmission Timing of an Uplink Downlink Pilot Time Slot (UpPTS).

The application of the present invention will not be limited only to the operations within a single TDD based cell, and, therefore, the present invention may also be applied to cases when a Half-duplex based user equipment that is not supported with simultaneous transception operations (or that cannot perform simultaneous transception operations) 1) operates within a single FDD-based cell, which is configured of a DL carrier and UL carrier pair, or 2) operates by configuring multiple cells, which having a different TDD DL-UL subframe structure.

More specifically, in case 1), a DL carrier within the same subframe may be configured (or set up) as a reconfiguration target special subframe, and the principles of the present invention may be applied based upon the assumption that the UL transmission operation of the corresponding special subframe is being performed by the UL carrier. Additionally, in case 2), a DL subframe of a first cell within the same subframe may be configured (or set up) as a reconfiguration target special subframe, and the principles of the present invention may be applied based upon the assumption that the UL transmission operation of the corresponding special subframe is being performed by the UL subframe of a second cell.

Figure 7:
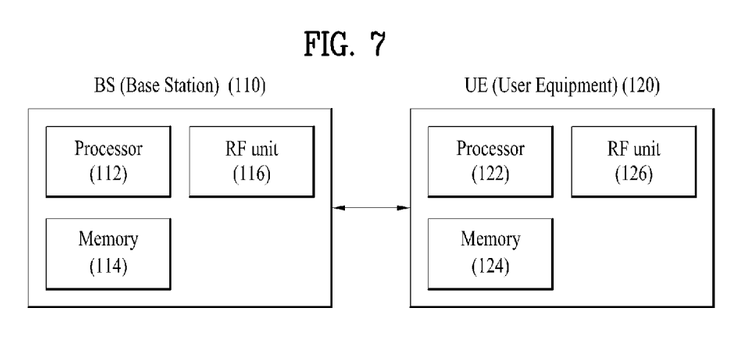
FIG. 7 illustrates an exemplary base station and an exemplary user equipment that can be applied to the embodiment of the present invention.

FIG. 7 illustrates an exemplary base station and an exemplary user equipment that can be applied to the embodiment of the present invention. When a relay is included in a wireless (or radio) communication system, in a Backhaul link, communication is realized between the base station and the relay. And, in an access link, communication is realized between the relay and the user equipment. Therefore, depending upon the respective situation, the terms base station and user equipment may be adequately replaced by the term relay.

Referring to FIG. 7, a wireless communication system includes a base station (BS, 110) and a user equipment (UE, 120). The base station (110) includes a processor (112), a memory (114), and a Radio Frequency (RF) unit (116). The processor (112) may be configured to realize the procedures and/or methods proposed in the present invention. The memory (114) is connected to the processor (112) and stores diverse information related to the operations of the processor (112). The RF unit (116) is connected to the processor (112) and transmits and/or receives radio signals. The user equipment (120) includes a processor (122), a memory (124), and an RF unit (126). The processor (122) may be configured to realize the procedures and/or methods proposed in the present invention. The memory (124) is connected to the processor (122) and stores diverse information related to the operations of the processor (122). The RF unit (126) is connected to the processor (122) and transmits and/or receives radio signals. The base station (110) and/or the user equipment (120) may have a single antenna or multiple antennae.

The embodiments described above correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods, e.g., being realized in the form of hardware, firmware, or software, or in a combination of hardware, firmware, and/or software. In case of implementing the embodiments of the present invention in the form of hardware, the method according to the embodiments of the present invention may be implemented by using at least one of ASICs (application specific integrated circuits), DSPs (digital signal processors), DSPDs (digital signal processing devices), PLDs (programmable logic devices), FPGAs (field programmable gate arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

It will be apparent to anyone skilled in the art that the present invention can be realized in another concrete configuration (or formation) without deviating from the scope and spirit of the characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents.

INDUSTRIAL APPLICABILITY

As described above, the method for transceiving (or transmitting/receiving) a signal between a user equipment and a base station in a wireless communication system and the apparatus for the same have been described based upon an example being applied to a 3GPP LTE system. However, the present invention may also be applied to diverse wireless communication systems other than the 3GPP LTE system.

What is claimed is:

1. A method of transceiving signals by a user equipment in a wireless communication system being operated by TDD (Time Division Duplex), the method comprising:
   monitoring a PDCCH (Physical Downlink Control CHannel) related with a special subframe;
   receiving a PDSCH (Physical Downlink Shared CHannel) corresponding to the PDCCH in the special subframe, if the PDCCH including a downlink assignment for the special subframe is detected, wherein the special subframe is indicated, by an indicator related to a reconfigured special subframe, for downlink transmission, and wherein the indicator is received through a downlink subframe, which exist directly before the special subframe, and wherein the PDSCH is received via at least one OFDM (Orthogonal Frequency Division Multiplexing) symbol corresponding to a GP (Guard Period) and a UpPTS (Uplink Pilot Time Slot) within the special subframe; and
   transmitting a PUSCH (Physical uplink Shared CHannel) corresponding to the PDCCH in another special subframe existing 4 subframes later, if the PDCCH containing an uplink grant for the special subframe is detected,
   wherein the another special subframe is indicated, by the indicator related to the reconfigured special subframe, for uplink transmission, and
   wherein the PUSCH is transmitted via at least one OFDM symbol corresponding to a GP (Guard Period) within the another special subframe.

2. The method of claim 1, wherein the GP of the special subframe is allocated to a reception ending point of the PDSCH.

3. The method of claim 2, further comprising:
   transmitting an uplink signal at a GP ending point of the special subframe.

4. The method of claim 3, wherein the uplink signal corresponds to an SRS (Sounding Reference Signal).

5. The method of claim 1, wherein the PDSCH is further received through one OFDM symbol of at least one of multiple OFDM symbols corresponding to a DwPTS (Downlink Pilot Time Slot), the DwPTS being defined in the special subframe in accordance with the TDD Uplink-Downlink Configuration.

6. A user equipment configured to transceive signals in a wireless communication system being operated by TDD (Time Division Duplex), the user equipment comprising:
   a Radio Frequency (RF) unit; and
   a processor,
   wherein the processor is configured to:
      monitor a PDCCH (Physical Downlink Control CHannel) related with a special subframe,
      receive a PDSCH (Physical Downlink Shared CHannel) corresponding to the PDCCH in the special subframe if a PDCCH including a downlink assignment for the special subframe is detected, wherein the special subframe is indicated, by an indicator related to reconfigured special subframe, for downlink transmission, and wherein the indicator is received through a downlink subframe, which exist directly before the special subframe, and wherein the PDSCH is received via at least one OFDM (Orthogonal Frequency Division Multiplexing) symbol corresponding to a GP (Guard Period) and a UpPTS (Uplink Pilot Time Slot) within the special subframe, and
      transmit a PUSCH (Physical uplink Shared CHannel) corresponding to the PDCCH in another special subframe existing 4 subframes later if the PDCCH containing an uplink grant for the special subframe is detected,
   wherein the another special subframe is indicated, by the indicator related to reconfigured special subframe, for uplink transmission, and
   wherein the PUSCH is transmitted via at least one OFDM symbol corresponding to a GP within the another special subframe.

7. The user equipment of claim 6, wherein the processor is configured to allocate the GP of the special subframe to a reception ending point of the PDSCH.

8. The user equipment of claim 7, wherein the processor is further configured to transmit an uplink signal at a GP ending point of the special subframe.

9. The user equipment of claim 8, wherein the uplink signal corresponds to an SRS (Sounding Reference Signal).

10. The user equipment of claim 6, wherein the PDSCH is further received through one OFDM symbol of at least one of multiple OFDM symbols corresponding to a DwPTS (Downlink Pilot Time Slot), the DwPTS being defined in the special subframe in accordance with the TDD Uplink-Downlink Configuration.

* * * * *